United States Patent
Streppel

(10) Patent No.: US 10,775,017 B2
(45) Date of Patent: Sep. 15, 2020

(54) LIGHTING DEVICE

(71) Applicant: OSRAM OLED GmbH, Regesnburg (DE)

(72) Inventor: Ulrich Streppel, Regensburg (DE)

(73) Assignee: OSRAM OLED GmbH, Regensburg (DE)

( * ) Notice: Subject to any disclaimer, the term of this patent is extended or adjusted under 35 U.S.C. 154(b) by 138 days.

(21) Appl. No.: 16/073,574

(22) PCT Filed: Jan. 12, 2017

(86) PCT No.: PCT/EP2017/050537
§ 371 (c)(1),
(2) Date: Jul. 27, 2018

(87) PCT Pub. No.: WO2017/129409
PCT Pub. Date: Aug. 3, 2017

(65) Prior Publication Data
US 2020/0141555 A1     May 7, 2020

(30) Foreign Application Priority Data
Jan. 29, 2016 (DE) .................. 10 2016 101 614

(51) Int. Cl.
*F21V 5/00* (2018.01)
*G03B 15/03* (2006.01)
*F21Y 115/10* (2016.01)
*G01C 3/08* (2006.01)

(52) U.S. Cl.
CPC .............. *F21V 5/005* (2013.01); *G03B 15/03* (2013.01); *F21Y 2115/10* (2016.08); *G01C 3/08* (2013.01)

(58) Field of Classification Search
CPC ..... F21V 5/005; G03B 15/03; F21Y 2115/10; G01C 3/08
See application file for complete search history.

(56) References Cited

U.S. PATENT DOCUMENTS

| | | | |
|---|---|---|---|
| 7,645,058 B2* | 1/2010 | Kurokawa | B32B 3/30 362/330 |
| 7,887,208 B2* | 2/2011 | Tsukada | G02B 5/0215 349/62 |
| 2005/0099824 A1* | 5/2005 | Dowling | A61B 1/0653 362/572 |

(Continued)

FOREIGN PATENT DOCUMENTS

| | | |
|---|---|---|
| CN | 101196582 A | 6/2008 |
| CN | 204730114 U | 10/2015 |

(Continued)

OTHER PUBLICATIONS

First Office Action dated Sep. 4, 2019, of counterpart Chinese Application No. 201780008666.3, along with an English translation.

*Primary Examiner* — Mary Ellen Bowman
(74) *Attorney, Agent, or Firm* — DLA Piper LLP (US)

(57) ABSTRACT

A lighting device includes a plurality of semiconductor light sources, the semiconductor light sources being configured to generate different light radiations; and an optical element arranged downstream of the semiconductor light sources, the optical element including on a side facing away from the semiconductor light sources a structure constituted of truncated pyramids.

20 Claims, 12 Drawing Sheets

(56) References Cited

U.S. PATENT DOCUMENTS

| | | |
|---|---|---|
| 2006/0104061 A1 | 5/2006 | Lerner et al. |
| 2007/0153495 A1 | 7/2007 | Wang et al. |
| 2008/0137193 A1 | 6/2008 | Hsu et al. |
| 2009/0129119 A1* | 5/2009 | Lee ............... B29C 33/3842 362/619 |
| 2010/0027242 A1* | 2/2010 | Kishine ............ G02B 5/045 362/97.1 |
| 2010/0124047 A1* | 5/2010 | Ahn ................ G02B 5/02 362/97.3 |
| 2012/0138981 A1 | 6/2012 | Chen et al. |
| 2020/0049877 A1* | 2/2020 | Watanabe ......... G02F 1/133606 |

FOREIGN PATENT DOCUMENTS

| | | |
|---|---|---|
| DE | 10 2006 016 218 A1 | 10/2007 |
| DE | 10 2007 057 671 A1 | 6/2009 |
| DE | 10 2012 209 354 A1 | 10/2013 |
| DE | 10 2013 203 912 A1 | 9/2014 |
| EP | 2 418 531 A1 | 2/2012 |
| EP | 2 593 975 B1 | 10/2015 |
| WO | 2015/197832 A1 | 12/2015 |
| WO | 2015/197932 A1 | 12/2015 |

* cited by examiner

FIG 17
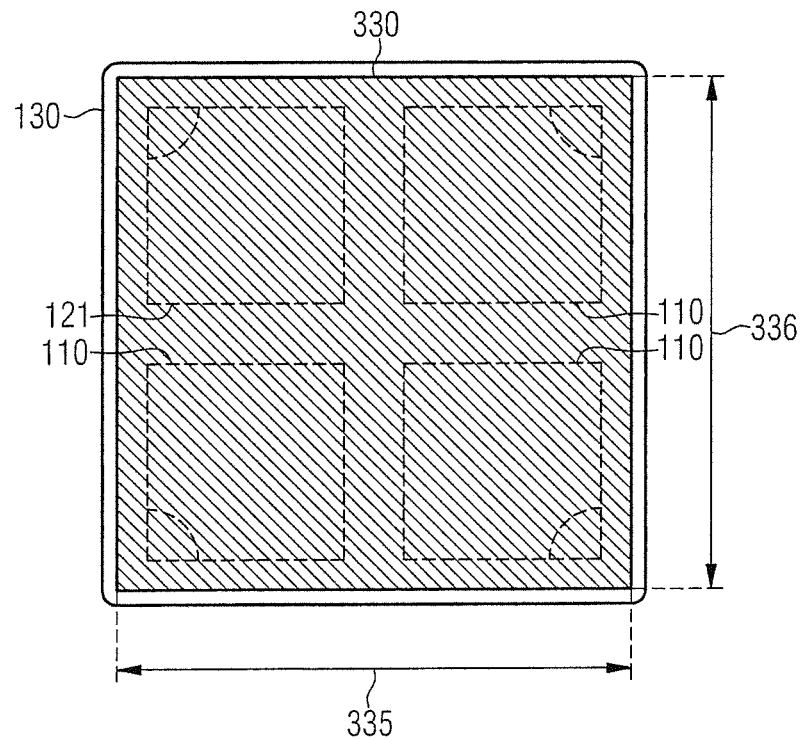
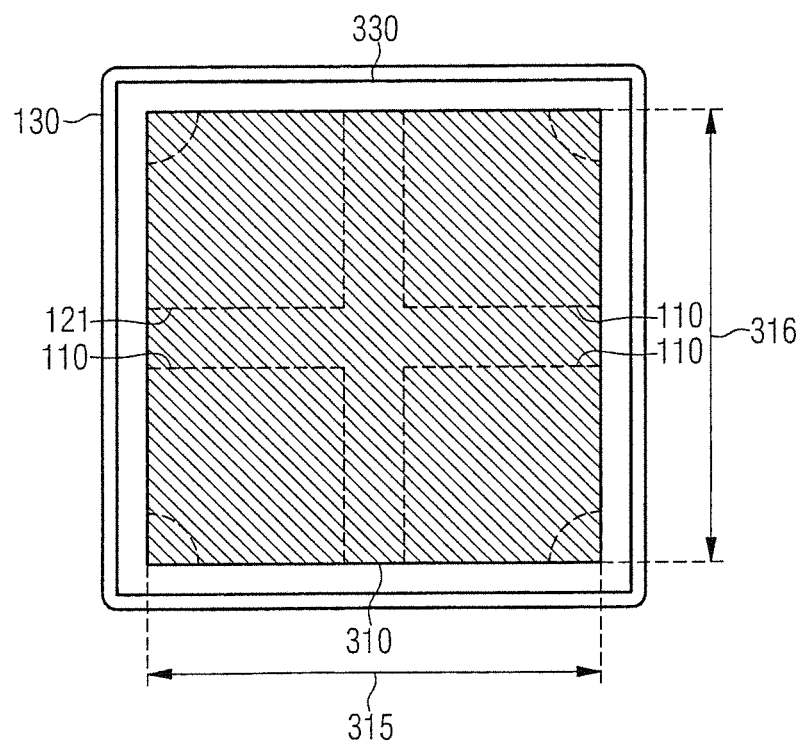

FIG 19
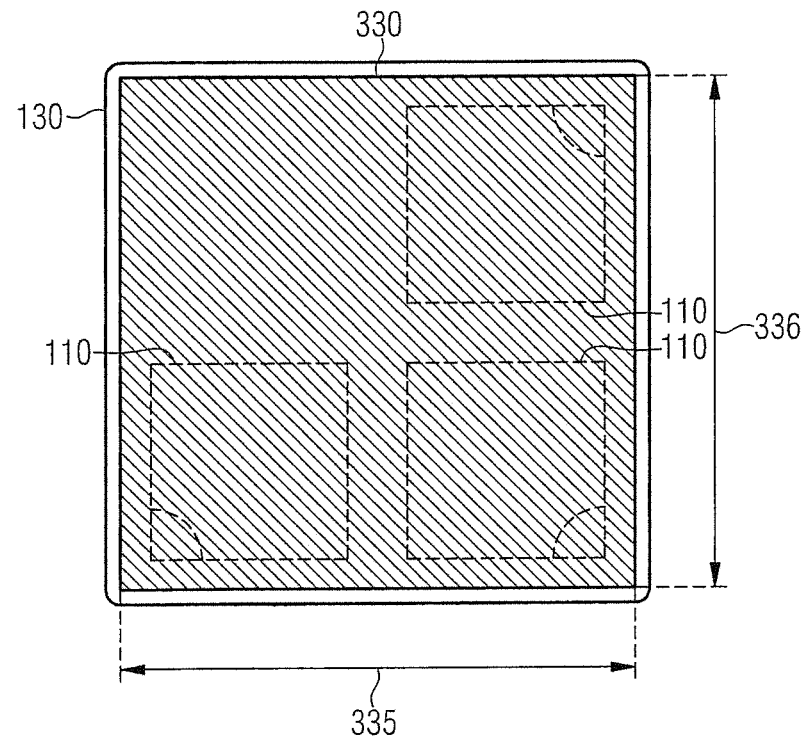
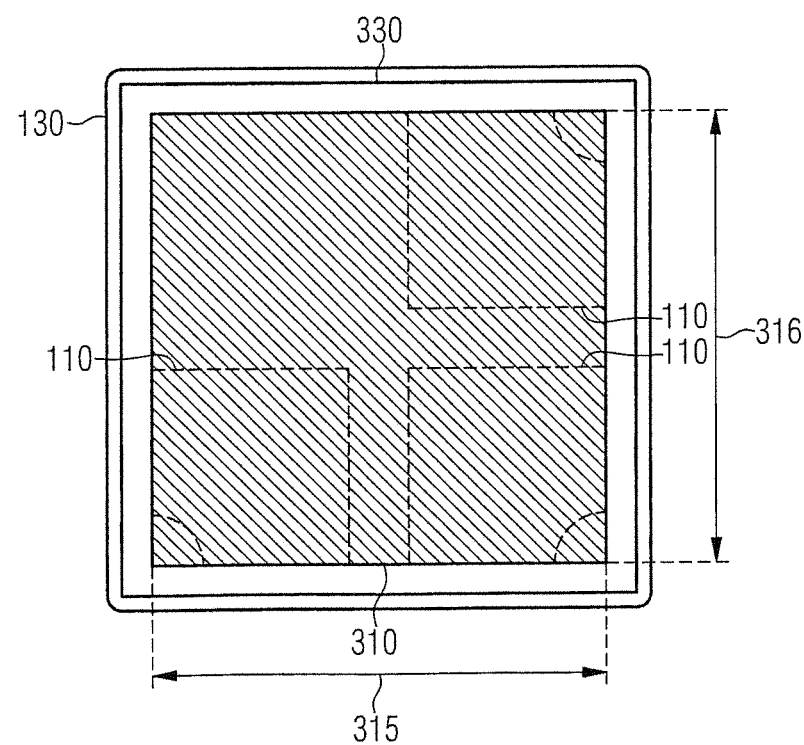

LIGHTING DEVICE

TECHNICAL FIELD

This disclosure relates to a lighting device with a plurality of semiconductor light sources and a mobile device with such a lighting device.

BACKGROUND

Mobile devices such as, for example, cell phones may comprise flashlights based on LEDs (Light Emitting Diodes). Such lighting devices may be configured to allow the color temperature of the white light that can be generated to be set. This can be realized by fitting emitters that emit different white light radiations, which are individually activated during operation.

Conventionally, each emitter comprises an optical unit of its own. This means that there is a great distance between the emitters and, as a consequence, a large outer size of a lighting device. On account of the great distance between the LED light sources provided with individual optical units, furthermore, color shadows can occur in the far field. The individual optical units may also impair the appearance and, consequently, the design of the associated mobile device.

There is thus a need to provide an improved lighting device and a mobile device with such a lighting device.

SUMMARY

I provide a lighting device including a plurality of semiconductor light sources, the semiconductor light sources being configured to generate different light radiations; and an optical element arranged downstream of the semiconductor light sources, the optical element including on a side facing away from the semiconductor light sources a structure constituted of truncated pyramids.

I also provide a mobile device including the lighting device including a plurality of semiconductor light sources, the semiconductor light sources being configured to generate different light radiations; and an optical element arranged downstream of the semiconductor light sources, the optical element including on a side facing away from the semiconductor light sources a structure constituted of truncated pyramids.

BRIEF DESCRIPTION OF THE DRAWINGS

FIG. 17 shows further representations of plan views of the optical element and of the semiconductor light sources, the structure area and the light source area being highlighted.

FIG. 19 shows further representations of plan views of the optical element with representations of the structure area and the light source area in the case of a configuration of the lighting device with three semiconductor light sources.

LIST OF DESIGNATIONS

Figure 1:
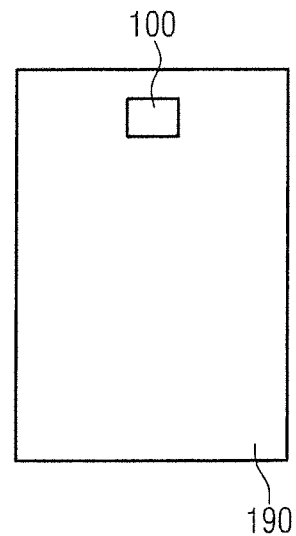
FIG. 1 shows a mobile device with a lighting device.

Lighting device 100
Light source 110
Semiconductor chip 111
Contact 112
Conversion element 115
Light source, semiconductor chip 121
Optical element 130
Side 131
Side 132
Truncated pyramid 140
Base area 141
Top area 142
Side face 143
Connecting line 145
Carrier 150
Reflective layer 151
Cover 160
Portion 161
Portion 162
Holder 170
Mobile device 190
Target area 200
Image angle 201
Image angle 202
Optical axis 210
Axis 211
Axis 212
Pyramid angle 241
Pyramid angle 242
Height 245
Width 246
Radiation 250
Light source area 310
Width 315, 316
Structure area 330
Width 335, 336

DETAILED DESCRIPTION

My lighting device comprises a plurality of semiconductor light sources. The semiconductor light sources are configured to generate different light radiations. The lighting device also comprises an optical element arranged downstream of the semiconductor light sources. The optical element comprises on a side facing away from the semiconductor light sources a structure constituted of truncated pyramids.

In the lighting device, a common radiation-transmissive optical element is used instead of individual optical units for the plurality of semiconductor light sources. As a result, the semiconductor light sources of which the lighting device may comprise at least two, can be arranged at a small distance from one another. Also, the lighting device can be realized with small outer dimensions. In addition, the use of the common optical element makes a homogeneous appearance of the lighting device possible.

On a side facing away from the semiconductor light sources, the optical element comprises a structure constituted of truncated pyramids. During operation of the lighting device, with the aid of this structure the different light radiations emitted by the semiconductor light sources can be optically imaged all together. When doing so, the various light radiations can be superposed, and the lighting device can emit a mixed radiation with a prescribed radiation characteristic. Superposing the various light radiations is accompanied by mixing the colors.

The mixing functionality of the optical element is based on the fact that the components of the radiation emitted by the individual truncated pyramids can each be radiated to the same target area or imaging area. When doing so, the truncated pyramids, comparable to lenses, can cause a bundling of the light. Furthermore, the structure constituted of truncated pyramids can bring about a partial return reflection of radiation. The component of the radiation reflected back can be reflected once again and diffusely scattered and, as a result, radiated again in the direction of the optical element in a mixed form.

On account of the mixing functionality, the influence of situations such as, for example, asymmetries in the arrangement of the semiconductor light sources or asymmetries in the light radiation of the individual semiconductor light sources can be suppressed. As a consequence, the light radiation of the lighting device can take place with great homogeneity, and an occurrence of color shadows in the far field can be avoided. This effect can be promoted by small distances between the semiconductor light sources. The structure size and shape of the optical element can be adapted to the size of the semiconductor light sources.

Further possible structures and details of the lighting device are described more specifically below.

In one example, the semiconductor light sources of the lighting device can be activated individually, that is to say independently and separately from one another. In this way it is possible to set the color or the color tone of the overall mixed radiation emitted by the lighting device flexibly by appropriate activation of the semiconductor light sources.

The optical element, which may also be referred to as a micro-optical unit or microstructured optical unit, may be formed from a transparent plastics material. A configuration from a glass material is also possible. The optical element may also be produced by a molding process such as, for example, injection molding.

The lighting device may be configured to illuminate a rectangular target area. When doing so, the illumination may take place at a first image angle and a second image angle. The first image angle may be a horizontal image angle. The second image angle may be a vertical image angle. The following examples may also be used in this connection.

The truncated pyramids may comprise four side faces. The truncated pyramids are also arranged in a regular rectangular grid. As a result, it is possible to achieve a quadrant-symmetrical light radiation so that a rectangular target area can be illuminated homogeneously.

The truncated pyramids may also comprise a rectangular base area and a rectangular top area. Adjacent truncated pyramids may also lie with their side faces opposite one another.

Furthermore, the transitions between the side faces of the truncated pyramids and also between the side faces and the top area may be configured in a rounded manner. As a result, the truncated pyramids may have an additional or enhanced lens effect, which promotes a homogeneous light radiation. The rounded transitions may, for example, have a radius of 50 μm. It is also possible that the overall top area of the truncated pyramids is configured in a rounded manner.

The truncated pyramids of the optical element may also be arranged directly next to one another so that there is a dense arrangement of truncated pyramids. The transitions between side faces of adjacent truncated pyramids may likewise be configured in a rounded manner.

The truncated pyramids of the optical element may be right truncated pyramids comprising four trapezoidal side faces, a rectangular top area and a rectangular base area. Furthermore, the truncated pyramids may have a first and a second pyramid angle that relate to an inclination of the side faces with respect to a line connecting centroids of the base area and the top area. In this case, two opposite side faces of the truncated pyramids have the first pyramid angle and two further opposite side faces of the truncated pyramids have the second pyramid angle. The pyramid angles are linked as follows to the aforementioned image angles:

$$0.83*FOVx \leq wx \leq 0.93*FOVx; \text{ and}$$

$$0.73*FOVy \leq wy \leq 0.83*FOVy,$$

where wx is the first pyramid angle, wy is the second pyramid angle, FOVx is the first or horizontal image angle, and FOVy is the second or vertical image angle.

For example, the pyramid angles wx=0.88*FOVx and wy=0.78*FOVy may be provided.

In a configuration of the optical element with right truncated pyramids comprising four trapezoidal side faces, a rectangular top area and a rectangular base area, furthermore, the following example may come into consideration. The semiconductor light sources have a width B of 0.5 mm to 2 mm, and a front-side width D of the truncated pyramids is linked to the width B of the semiconductor light sources according to $$D=0.13*B.$$

Furthermore, a height H of the truncated pyramids is linked as follows to the width B of the semiconductor light sources:

$$0.15*B \leq H \leq 0.25*B.$$

For example, a height H=0.2*B may be provided.

The aforementioned examples with the indications of the pyramid angles and dimensions of the truncated pyramids make it possible for the lighting device to function in an efficient way.

The homogeneous illumination of a rectangular target area may be promoted by the plurality of semiconductor light sources being arranged in a rectangular symmetry. This may involve the semiconductor light sources being positioned in a rectangular arrangement or in a rectangular grid.

The lighting device may be, for example, realized with four semiconductor light sources arranged at four corner points of an imaginary rectangle. Also possible is a configuration of the lighting device with, for example, three semiconductor light sources arranged at three corner points of an imaginary rectangle so that one corner point of the imaginary rectangle is not occupied.

The plurality of semiconductor light sources may, for example, have a rectangular or square contour.

A distance between adjacent semiconductor light sources may be at most 0.1 mm. This also includes a configuration in which semiconductor light sources are directly adjacent to one another. In this way, a homogeneous light radiation can be promoted.

The lighting device may be, for example, a flashlight and configured to emit a white light radiation. The following examples may come into consideration in this connection.

The plurality of semiconductor light sources or at least some of the plurality of semiconductor light sources may be configured to produce white light radiations with different white tones. As a result, the lighting device can emit a white light radiation formed by superposing the individual white light radiations of the semiconductor light sources. In this example, the white tone of the overall light radiation emitted by the lighting device can be set by a suitable activation of the semiconductor light sources. The lighting device may, for example, comprise three semiconductor light sources configured to emit a cold-white light radiation, a neutral-white light radiation and a warm-white light radiation.

The plurality of semiconductor light sources or at least some of the plurality of semiconductor light sources may each comprise a radiation-emitting semiconductor chip and a conversion element for radiation conversion arranged on the semiconductor chip. The semiconductor chip may be a light-emitting diode chip or LED chip. The conversion element may comprise at least one suitable phosphor. During operation, the semiconductor chip may generate a primary light radiation that can be converted into one or more secondary light radiations with the aid of the associated conversion element. A corresponding mixed radiation can be generated by superposing these light radiations.

The aforementioned configuration may be used, for example, with respect to the semiconductor light sources described above to generates a white light radiation. For example, the semiconductor chip of a light source may be configured to generate a blue primary radiation and the associated conversion element may be configured to generate a yellow secondary radiation that can be superposed to form a white light radiation. Different white tones of the light sources can be realized by different configurations of the conversion elements.

One of the plurality of semiconductor light sources may be configured to generate an infrared light radiation. This configuration may be used, for example, to realize a distance measurement. The infrared light source may be formed by a radiation-emitting semiconductor chip without a conversion element.

Along with the plurality of semiconductor light sources and the micro-optical unit with the structure constituted of truncated pyramids, the lighting device may comprise at least one further component so that a corresponding housing may be present. In this connection, at least a reflective or highly reflective housing material may be used to achieve the reflection and scattering described above of the component of the radiation reflected back by the micro-optical unit. Possible configurations are described below.

The lighting device may comprise a carrier on which the semiconductor light sources are arranged. The carrier may comprise electrical conductor structures, to which the semiconductor light sources are electrically connected so that they can be supplied with electrical energy. The interconnection of the semiconductor light sources may be configured here such that the semiconductor light sources can be activated individually as specified above. The carrier may be, for example, a circuit board.

The carrier may comprise a reflective layer laterally of the semiconductor light sources. In this way, the reflection and scattering of the component of the radiation reflected back by the optical element can be reliably realized. The reflective layer may be, for example, a layer of a matrix material with reflecting or scattering particles embedded therein. Other configurations are also possible, for example, a configuration as a reflective solder resist coating or as a reflective film.

The semiconductor light sources may also be configured to achieve a high reflectivity to promote the reflection and scattering of the component of the radiation that is reflected back. For this purpose, the semiconductor light sources or their semiconductor chips may comprise an internal mirror layer.

The lighting device may comprise a radiation-transmissive cover, with which the side of the optical element facing away from the semiconductor light sources is covered. In this way, the structure constituted of truncated pyramids can be reliably protected from external influences. The cover may be formed from a transparent plastics material.

The lighting device may comprise a holding device. The holding device holds the optical element and/or the cover. The holding device may have a frame-like enclosing form. Furthermore, the holding device may be arranged on the carrier described above.

The following examples may also come into consideration for the lighting device and its optical element.

The optical element may have a circular contour. Also possible is a configuration of the optical element with a rectangular or square contour. The aforementioned components such as the cover and the holding device may be configured in a way specifically designed for this.

The structure of the truncated pyramids may be present in a structure area of the optical element. The structure area may have a contour corresponding to the contour of the optical element and is smaller compared to the contour of the optical element. In this case, the optical element may comprise on the side facing away from the semiconductor light sources a planar area running around the structure area. This area may be used, together with the lateral periphery of the optical element, to secure the optical element on a further component, for example, the cover explained above or the holding device.

The optical element may comprise a rectangular structure area in which the structure constituted of truncated pyramids is arranged. A rectangular light source area in which the semiconductor light sources are arranged and the contour of which is defined by the contours of the semiconductor light sources, is covered by the structure area, seen in plan view. The structure area and the light source area are of the same size or essentially the same size in terms of the lateral dimensions.

The example described above is made possible by the mixing functionality of the optical element, which on account of the structure constituted of truncated pyramids can bring about a partial return reflection of radiation, it being possible for this component of the radiation to be reflected again in the direction of the optical element in a scattered and mixed form. This property allows the law of conservation of etendue applicable to optical systems to be circumvented. As a result, it is possible to make the optical element or the optically effective structure area of the optical element in which the structure constituted of truncated pyramids is located the same size or essentially the same size as the light source area comprising the semiconductor light sources.

In the aforementioned example, the optical element may be configured with relatively small lateral dimensions. In a corresponding way, the overall lighting device may be realized with relatively small outer dimensions and, consequently, with a compact and space-saving structure. This promotes the possible use of the lighting device in a mobile device as explained more specifically below.

As long as the structure area and the light source area are of the same size, the structure area may be located congruently over the light source area. As long as the structure area and the light source area are of essentially the same size, the structure area may be larger than the light source area and protrude laterally beyond the light source area. The lateral protrusion may be present, for example, on two opposite sides of the light source area, and also if appropriate on two further opposite sides and, consequently, on all four sides of the light source area.

For the variant that the structure area and the light source area are of essentially the same size, the following example may also come into consideration to make a compact structural design of the lighting device possible. A width of the structure area is at most 20% greater than a width of the light source area. This property may apply with respect to an extent of the structure area and the light source area in a first direction. The aforementioned property may also apply in a second direction, perpendicular to the first direction. It is also possible that the structure area and the light source area only have a different width with respect to a first direction, and have a coinciding width with respect to a second direction perpendicular thereto.

I also provide a mobile device that comprises the lighting device described above or a lighting device according to one or more of the examples described above. In this way, the advantages described above, for example, a homogeneous light radiation into a predetermined target area, can be realized. The lighting device can also have a homogeneous appearance, whereby the mobile device can be distinguished by an attractive design.

The mobile device may be, for example, a cell phone. In this case, the mobile device may comprise a camera, and the lighting device may be configured as a flashlight of the mobile device with a plurality of semiconductor light sources that emit a white light radiation.

As specified above, the lighting device may comprise an additional semiconductor light source that emits infrared light radiation. In this connection, the mobile device may comprise a specifically designed detector, whereby a measurement of the distance from objects or persons illuminated by the lighting device can be realized.

The advantageous configurations and developments that have been explained above—apart from, for example, in cases of clear dependencies or incompatible alternatives—be applied individually or else in any desired combination with one another.

The properties, features and advantages described above, and the manner in which they are achieved, will become clearer and more clearly understood in association with the following description of examples explained in greater detail in association with the schematic drawings.

Possible configurations of a lighting device 100, which is used as a flashlight of a mobile device 190, are described on the basis of the following schematic figures. The figures are only of a schematic nature and are not to scale. In this sense, components and structures shown in the figures may be represented as excessively large or small for better understanding. In the same way, it is possible that the lighting device 100 and the mobile device 190 may comprise further components and structures in addition to the components and structures shown and described.

FIG. 1 shows a schematic representation of a mobile device 190. The mobile device 190 which is, for example, a cell phone comprises a camera (not represented) to take pictures. To improve illumination during operation of the camera, the mobile device 190 also comprises a lighting device 100 serving as a flashlight.

Figure 2:
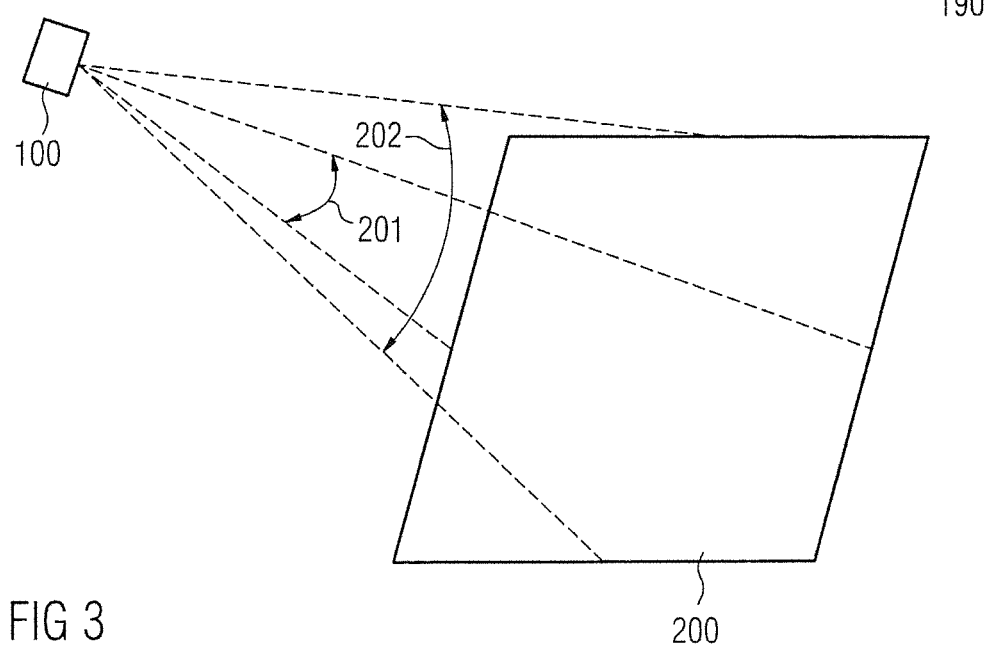
FIG. 2 shows lighting operation of the lighting device, the lighting device illuminating a rectangular target area.

The lighting device 100 is configured to emit a white light radiation. When doing so, a rectangular target area 200 at a prescribed distance may be illuminated as represented in FIG. 2. The distance may be, for example, 1 m. The illumination takes place at a first image angle 201 and a second image angle 202. As indicated in FIG. 2, the first image angle 201 may be a horizontal image angle, also referred to hereinafter as FOVx (Field of View), and the second image angle 202 may be a vertical image angle, also referred to hereinafter as FOVy.

Figure 3:
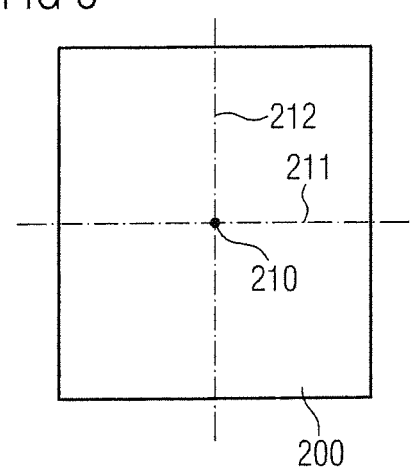
FIG. 3 shows the rectangular target area, an optical axis and a system of coordinates being additionally represented.

With the aid of the lighting device 100, the rectangular target area 200 can be illuminated homogeneously. For this purpose, the lighting device 100 is configured for light radiation with quadrant symmetry. To explain this property, FIG. 3 shows the rectangular target area 200, while also depicting an optical axis 210 of the lighting device 100 and a first axis 211 (x-axis) and a second axis 212 (y-axis) of a system of coordinates perpendicular to the optical axis 210. The two axes 211, 212, which relate to the horizontal and vertical extent of the target area 200, are perpendicular to one another and intersect in the optical axis 210.

The lighting device 100 is configured such that the illumination is mirror-symmetrical with respect to a reflection at a plane formed by the first axis 211 and the optical axis 210 and also with respect to a reflection at a plane formed by the second axis 212 and the optical axis 210. Such a distinct form is referred to as quadrant symmetry.

The aforementioned optical properties can be reliably achieved with the aid of the structure of the lighting device 100 described below.

Figure 4:
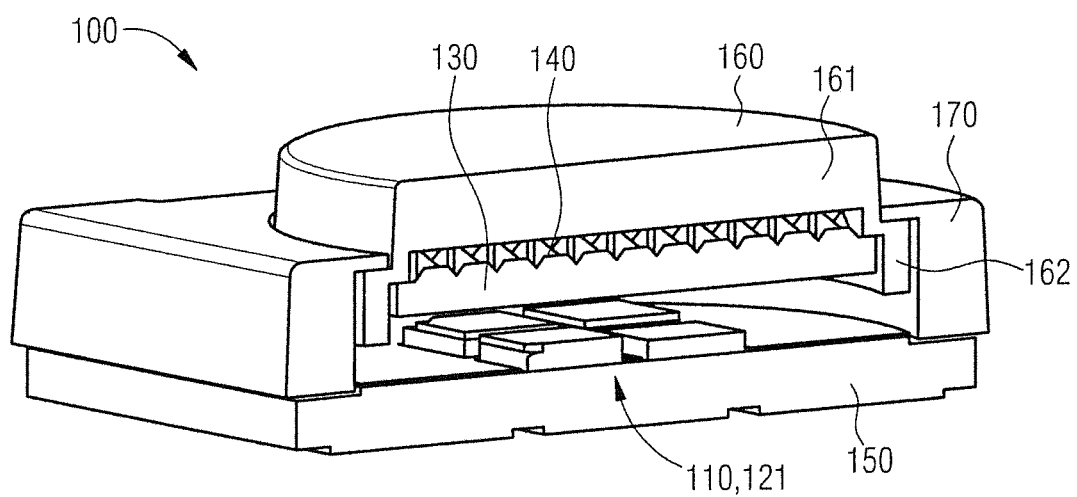
FIG. 4 shows a perspective sectional representation of the lighting device, the lighting device comprising a carrier, a plurality of semiconductor light sources, an optical element with a structure constituted of truncated pyramids, a cover and a holder.
Figure 5:
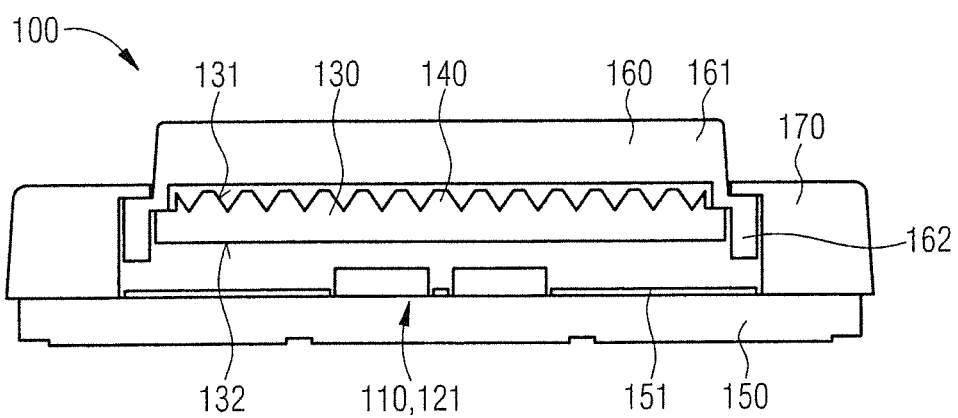
FIG. 5 shows a sectional representation of the lighting device.

FIG. 4 shows a possible configuration of the lighting device 100 in a perspective sectional representation. A corresponding lateral sectional representation of the lighting device 100 is shown in FIG. 5. The lighting device 100 comprises a plurality of semiconductor light sources 110 each configured to generate a white light radiation. Optionally, the lighting device 100 may comprise an additional semiconductor light source 121 that generates an infrared light radiation. The semiconductor light sources 110, 121 are arranged on a carrier 150. This may also be referred to as a substrate 150 or carrier substrate 150. The semiconductor light sources 110, 121 electrically connect to the carrier 150 or conductor structures of the carrier 150 such that the semiconductor light sources 110, 121 are individually activated and, as a result, can be operated separately from one another to radiate light (not shown).

A further component of the lighting device 100 is a radiation-transmissive optical element 130 arranged downstream of the semiconductor light sources 110, 121. The optical element 130, which is assigned to all of the semiconductor light sources 110, 121 together, may also be referred to as a micro-optical unit. The optical element 130 is at a distance from the semiconductor light sources 110, 121 and comprises a structure constituted of truncated pyramids 140. The truncated pyramids 140 are arranged directly next to one another. During operation of the lighting device 100, the light radiations of the semiconductor light sources 110, 121 can be optically imaged all together and mixed with the aid of this micro-optical structure. In this way, the radiation characteristic described above, i.e., the homogeneous quadrant-symmetrical illumination of the rectangular target area 200 can be realized. Details of this are explained still more specifically further below.

On account of the optical element 130 used for all of the semiconductor light sources 110, 121 together, the lighting device 100 can also have a homogeneous appearance. As a consequence, the mobile device 190 can be distinguished by an attractive design.

Further component parts of the lighting device 100 are a radiation-transmissive cover 160, covering the optical element 130, and a holder 170, arranged on the carrier 150. In the configuration shown in FIGS. 4 and 5, the optical element 130 is arranged on the cover 160, and the cover 160 is held by the holder 170.

Further possible details of the structure and the functioning of the lighting device 100 are explained below, partly on the basis of further figures.

Figure 6:
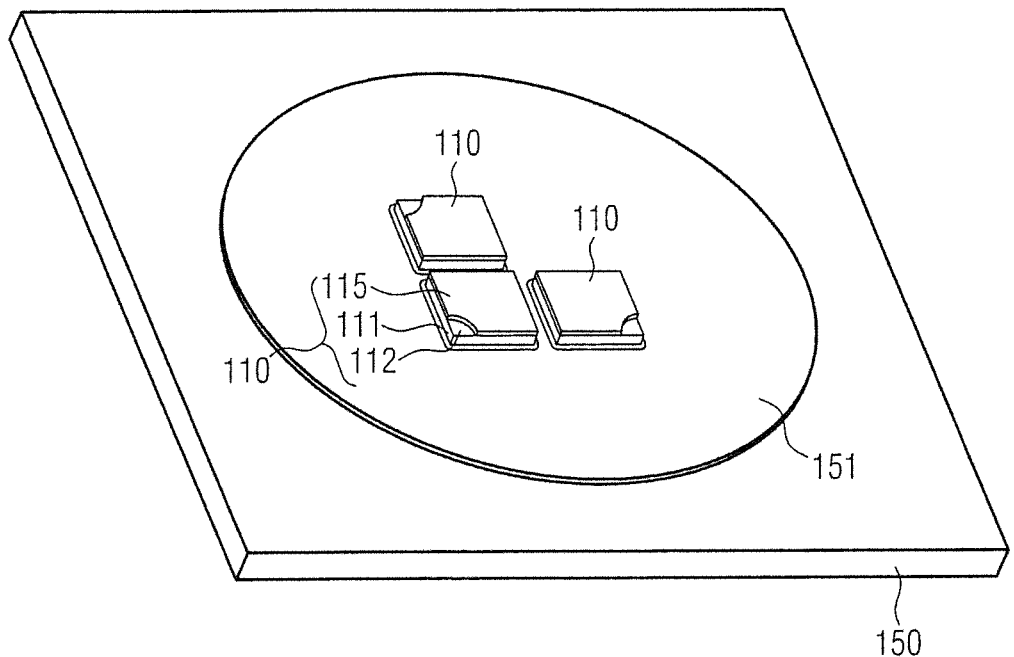
FIGS. 6 and 7 show perspective representations of the carrier with semiconductor light sources.

FIG. 6 shows a perspective representation, in which only the carrier 150 of the lighting device 100 with semiconductor light sources 110 arranged on it is illustrated. In this configuration, three semiconductor light sources 110 are used to generate white light radiations. The light radiations of the individual semiconductor light sources 110 differ in their color tone or white tone. The three semiconductor light sources 110 may be, for example, configured to produce a cold-white light radiation, a neutral-white light radiation and a warm-white light radiation.

During operation of the lighting device 100 constructed in a way corresponding to FIG. 6, the lighting device 100 may emit a white mixed radiation formed by superposing the different white light radiations of the semiconductor light sources 110. The color temperature of the overall white radiation can be set by appropriate activation of the semiconductor light sources 110.

Each of the semiconductor light sources 110 comprises a radiation-emitting semiconductor chip 111 and a conversion element 115 for radiation conversion arranged on the semiconductor chip 111 as shown in FIG. 6. The semiconductor chips 111, which have a rectangular or square contour, may be LED chips. As a consequence, the lighting device 100, constructed in a modular manner, may also be referred to as an LED module or flashlight LED. The semiconductor chips 111 may be produced by thin-film technology. It is also possible to use semiconductor chips 111 realized in the form of sapphire chips or sapphire flip chips.

The semiconductor chips 111 of the semiconductor light sources 110 may be configured to generate a blue primary radiation, and the conversion elements 115 may be configured to partially convert the primary radiation into the yellow secondary radiation so that by superposing these components of the radiation a white light radiation can be generated. The semiconductor chips 111 may comprise the same structure in each case, and the different white tones of the semiconductor light sources 110 may be realized by different configurations of the conversion elements 115 or a phosphor of the conversion elements 115.

With respect to the electrical contacting of the semiconductor light sources 110, a possible structural form of the semiconductor chips 111, with a contact 112 on a front side and a contact (not represented) on a back side opposite therefrom, is indicated in FIG. 6. The front-side contact 112, which may be referred to as a bonding pad, is located at a corner of the semiconductor chips 111. Designed specifically for this, the conversion elements 115 each comprise a clearance so that the contacts 112 of the semiconductor chips 111 are exposed. The front-side contacts 112 may, for example, connect by way of bonding wires to mating contacts of the carrier 150 (not represented).

With the back-side contacts, the semiconductor chips 111 are arranged on further mating contacts of the carrier 150. At these locations, an electrical and mechanical connection can be established by way of a connecting means such as, for example, a soldering means or an electrically conductive adhesive (not represented).

Furthermore, the semiconductor light sources 110 are arranged in a rectangular symmetry in relation to one another as shown in FIG. 6. The semiconductor light sources 110 are located at corner points of an imaginary rectangle, one corner point of the rectangle not being occupied. This configuration allows the homogeneous illumination of the rectangular target area 200 to be promoted.

The semiconductor light sources 110 or their semiconductor chips 111 are also arranged at a small distance from one another. The distance may be 0.1 mm or even less. This configuration makes it possible to avoid an occurrence of color shadows in the far field of the lighting device 100 and, as a result, to further promote the homogeneous illumination of the target area 200.

As a departure from the structural form shown in FIG. 6, semiconductor chips 111, for example, comprising exclusively back-side contacts may also be used. These include the aforementioned sapphire flip chips. In this configuration, there is no need for the bonding pad 112 shown in FIG. 6, on the semiconductor chips 111 and, consequently, the contacting via the front side of the chip. Conversion elements 115 without a clearance may also be used on the semiconductor chips 111.

The carrier 150, which, as shown in FIG. 6, may have a rectangular or square contour may be, for example, a circuit board (PCB, Printed Circuit Board). Furthermore, the carrier 150 comprises a reflective layer 151 on the side loaded with the semiconductor light sources 110. The reflective layer 151 serves the purpose of reflecting and diffusely scattering a component of the radiation reflected back by the optical element 130 during operation of the lighting device 100 back to the optical element 130. The reflective layer 151 may have a high reflectivity of at least 80% and also a Lambertian radiation characteristic.

The reflective layer 151 may have a circular contour as represented in FIG. 6. Furthermore, each reflective layer 151 is located laterally of the semiconductor light sources 110 so that, seen from above, the semiconductor light sources 110 are surrounded by the reflective layer 151. For this purpose, the reflective layer 151 comprises corresponding clearances, as also shown in FIG. 5, within which the semiconductor chips 111 of the semiconductor light sources 110 are arranged on the carrier 150 or on the aforementioned mating contacts of the carrier 150. As a departure from FIGS. 5 and 6, the reflective layer 151 may reach out laterally to the semiconductor light sources 110.

The reflective layer 151 may be, for example, a layer of a matrix material (for example, silicone) with reflecting or scattering particles embedded therein (for example, $TiO_2$ particles). Other configurations, for example, a configuration as a reflective solder resist coating or as a reflective film, are also possible.

FIGS. 5 and 6 show a configuration in which the reflective layer 151 has a smaller thickness compared to the semiconductor light sources 110. The reflective layer 151 may also be configured such that a thickness of the reflective layer 151 coincides or virtually coincides with a thickness or height of the semiconductor light sources 110 (not represented). As a result, an upper side of the reflective layer 151 and front sides of the semiconductor light sources 110 may lie at the same height or almost the same height (for example, with a maximum difference in height of 0.01 mm). In the case of this configuration, it can be achieved that, in lighting operation, a radiation possibly emerging laterally from side faces of the semiconductor light sources 110 is reflected back into the semiconductor light sources 110, and radiation emitted via the front side of the semiconductor light sources 110 does not undergo any interaction with the reflective layer 151.

With respect to the return reflection of radiation, the semiconductor light sources 110 or their semiconductor chips 111 are likewise configured with a high reflectivity. For example, the semiconductor chips 111 may comprise an internal mirror layer (not represented).

Figure 7:
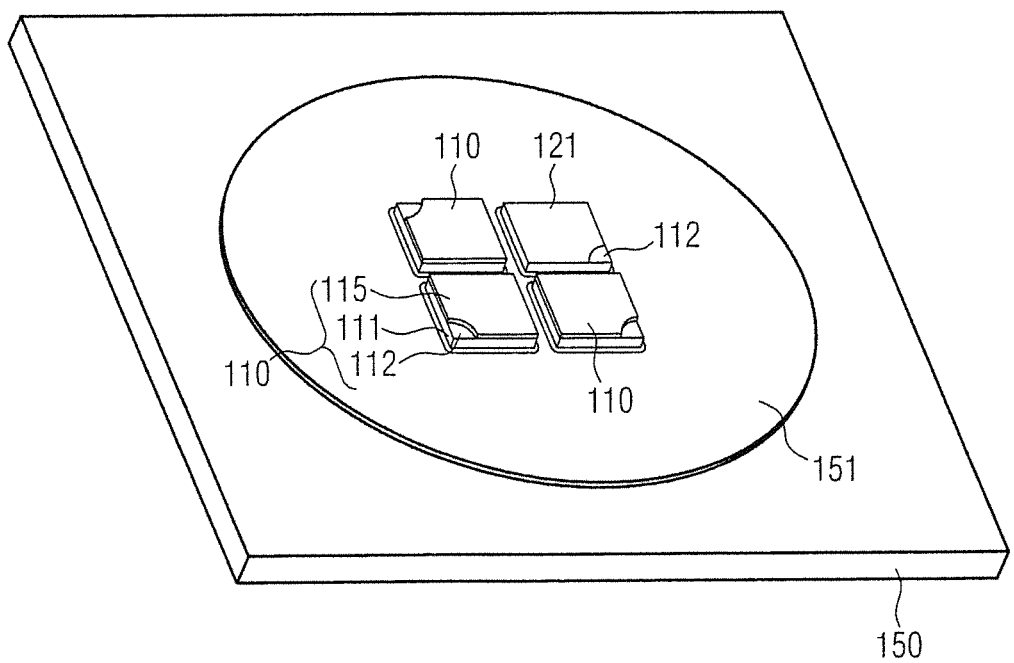

FIG. 7 shows in a perspective representation a further configuration for the lighting device 100. This configuration, which is also indicated in FIG. 4, represents a development of the structure of FIG. 6. To this extent, reference is made to the previous description with respect to details of components that are the same or act in the same way. According to FIG. 7, along with the three white semiconductor light sources 110, on the carrier 150 there is an additional semiconductor chip 121. The semiconductor chip 121, which likewise may be an LED chip, is configured to generate an infrared light radiation and, therefore is an infrared light source. A conversion element is not provided on the semiconductor chip 121.

In the structural form shown in FIG. 7, the semiconductor chip 121, like the other semiconductor chips 111, comprises a back-side contact (not represented) and a front-side contact 112, which is indicated in FIG. 7. In this way, the semiconductor chip 121 can be arranged on the carrier 150 and electrically connected to it in the manner described above in relation to the semiconductor chips 111. In a corresponding way, the semiconductor chip 121 may have a high reflectivity or, for this purpose, an internal mirror layer. As a departure from FIG. 7, semiconductor chips 110, 121 with, for example, only back-side contacts may also be used.

The four semiconductor light sources 110, 121 are arranged in a rectangular symmetry and at a small distance from one another as shown in FIG. 7. The distance may be 0.1 mm or even less. The reflective layer 151 of the carrier substrate 150 comprises clearances for all of the semiconductor light sources 110, 121. As a departure from FIG. 7, the reflective layer 151 may be configured with a thickness that coincides or virtually coincides with the semiconductor light sources 110, 121.

The infrared semiconductor light source 121 may be used, for example, to measure the distance from objects or persons illuminated by the lighting device 100. For such an application, the mobile device 190 equipped with the lighting device 100 may comprise a detector specifically designed to receive the infrared radiation reflected at an object or at a person (not represented).

Figure 8:
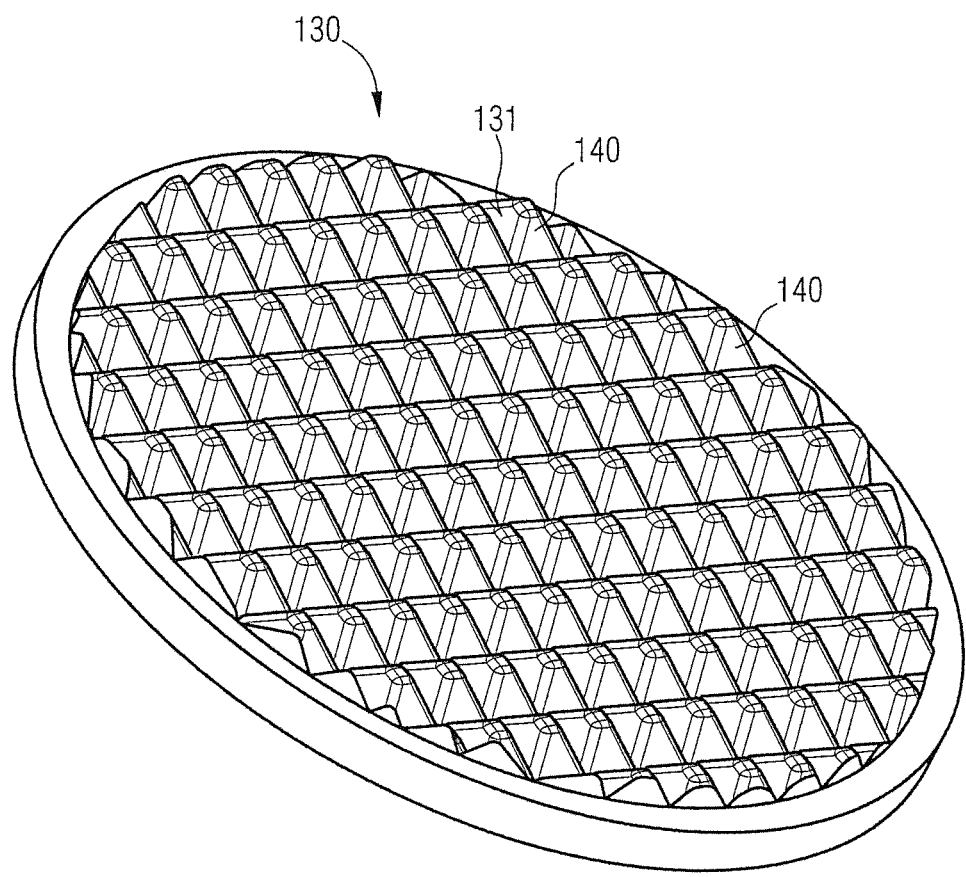
FIG. 8 shows a perspective representation of the optical element.
Figure 9:
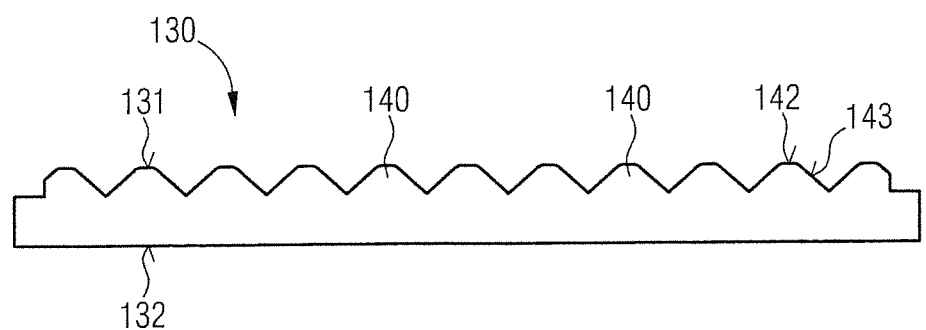
FIG. 9 shows a sectional representation of the optical element.

FIG. 8 shows a perspective representation of the optical element 130 of the lighting device 100 from FIG. 4. A lateral sectional representation of the optical element 130 is shown in FIG. 9. The optical element 130, which as represented in FIG. 8, may have a circular contour, may be formed from a radiation-transmissive plastics material such as, for example, PC (polycarbonate), PMMA (polymethyl methacrylate), epoxide or silicone, or else be formed from a glass material. Production of the optical element 130 may be performed with the aid of a molding process, for example, injection molding. The plate-shaped or, because of the circular contour, disk-shaped optical element 130 comprises two opposite main sides 131, 132. The side 132 is configured as planar, and the other side 131 comprises the structure already mentioned above with a plurality of elevations or structure elements in the form of truncated pyramids 140.

In the assembled state of the lighting device 100, as shown in FIGS. 4 and 5, the planar side 132 of the optical element 130 is facing the semiconductor light sources 110, 121. The planar side 132 is kept at a distance from the semiconductor light sources 110, 121 so that there is an air gap. On the other hand, the side 131 of the optical element 130 configured in a structured manner faces away from the semiconductor light sources 110, 121. This side 131 lies at a distance opposite the cover 160, i.e., a disk-shaped or circular-cylindrical portion 161 of the cover 160 located above the optical element 130 so that there is also an air gap at this location.

As shown in FIGS. 4 and 5, along with the circular-cylindrical portion 161, the cover 160 comprises extending therefrom a collar-shaped portion 162 having in cross section a stepped form and by which the optical element 130 is enclosed in a circular manner. Like the optical element 130, the cover 160 is radiation-transmissive, and may be formed from one of the materials mentioned above in relation to the optical element 130.

The holder 170, which is arranged on the carrier 150 and may be made radiation-transmissive or radiation-nontransmissive, has, as also shown in FIGS. 4 and 5, a form that encloses the cover 160, or the portion 162 thereof, in a circular or frame-like manner and comprises a sub-portion protruding inwardly on the front side. The carrier 150, the cover 160 and the holder 170 form a housing of the lighting device 100. Seen from above, the holder 170 may have a rectangular outer contour as indicated in FIG. 4.

The cover 160 and the micro-optical unit 130 arranged on it, and also the holder 170 and the cover 160, may each connect to one another by way of a connecting means (not represented), for example, an adhesive. This applies in a corresponding way to a connection between the carrier 150 and the holder 170 arranged on it.

As a departure from the separate configuration of the cover 160 and the holder 170 shown in FIGS. 4 and 5, the cover 160 and the holder 170 may also be configured as a single transparent body. Furthermore, the cover 160 and the holder 170 may be produced together by two-component injection molding. When doing so, the cover 160 and the holder 170 may form a single or contiguous element, which differ in transparency. For example, the cover 160 may be configured as transparent, and the holder 170 as not transparent, for example, diffusely scattering or black.

During operation of the lighting device 100, the light radiations emitted by the semiconductor light sources 110, 121 may be coupled via the planar side 132 into the transparent optical element 130 and coupled out again from it via the structured side 131. The light radiations are thereby mixed so that, after passing through the transparent cover 160, the lighting device 100 can give off a homogeneous mixed radiation with the radiation characteristic shown in FIG. 2 to illuminate the target area 200.

The mixing functionality of the optical element 130 is based on the fact that each truncated pyramid 140 can radiate a component of the radiation passing through the truncated pyramid 140 concerned into the entire target area 200 in a way corresponding to a lens. In addition, with the aid of the frustopyramidal structure elements 140, the aforementioned partial return reflection of radiation can be brought about, which is accompanied by a further mixing of the light. This is discussed in still more detail further below in connection with FIG. 11.

To achieve the effect that the light radiation is quadrant-symmetrical and, as a result, the rectangular target area 200 shown in FIG. 2 can be illuminated, the truncated pyramids 140 are arranged in a regular rectangular grid as represented in FIG. 8. Furthermore, in a way corresponding to the rectangular grid, four-sided right truncated pyramids 140 are used.

Figure 10:
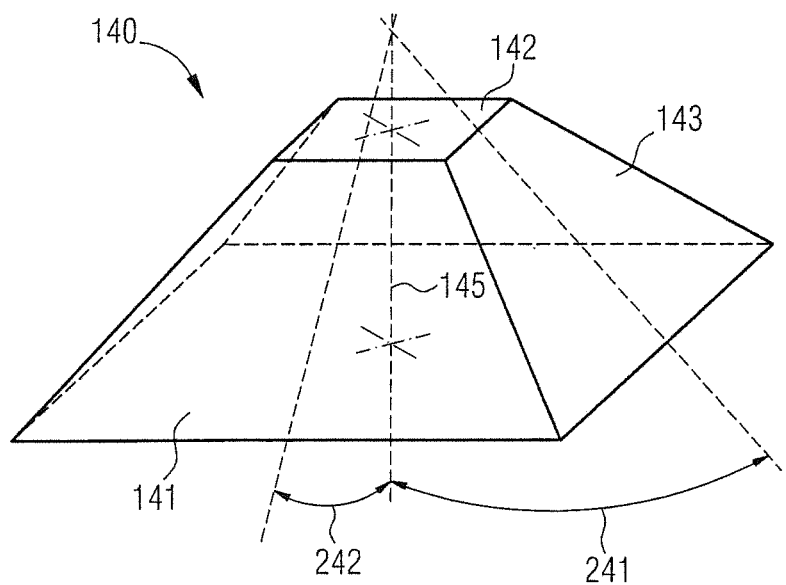
FIG. 10 shows a perspective representation of a truncated pyramid.

To explain this structure, a truncated pyramid 140 is perspectively represented in FIG. 10. The truncated pyramid 140 comprises a rectangular base area 141, a rectangular top area 142 and four trapezoidal side faces 143 connecting the base area 141 and the top area 142. The base area 141 may not be square. This may also apply to the top area 142. In FIG. 10, a connecting line 145, connecting the centroids of the base area 141 and the top area 142, is additionally depicted. In the right truncated pyramid 140, the connecting line 145 extends perpendicularly in relation to the base area 141 and the top area 142.

Also represented in FIG. 10 are two pyramid angles 241, 242 that relate to the alignment or inclination of side faces 143 with respect to the connecting line 145. Two opposite side faces 143 have the angle of inclination 241, and two further opposite side faces 143 have the angle of inclination 242. The angles of inclination 241, 242 may differ.

In the optical element 130 from FIG. 8, adjacent truncated pyramids 140 lie with their side faces 143 opposite. The truncated pyramids 140 of the optical element 130 shown in FIG. 8 differ from the geometrical form shown in FIG. 10 to the extent that there are no sharp edges between the side faces 143 and between the side faces 143 and the top area 142, but instead the transitions between the side faces 143 and between the side faces 143 and the top area 142 are configured in a rounded manner. As a result, the truncated pyramids 140 can have an additional or enhanced lens effect that promotes the homogeneous illumination of the target area 200. It is also possible that the entire top area 142 is configured in a slightly rounded manner. Furthermore, the transitions between the side faces 143 of adjacent truncated pyramids 140 may each be configured in a slightly rounded manner.

Figure 11:
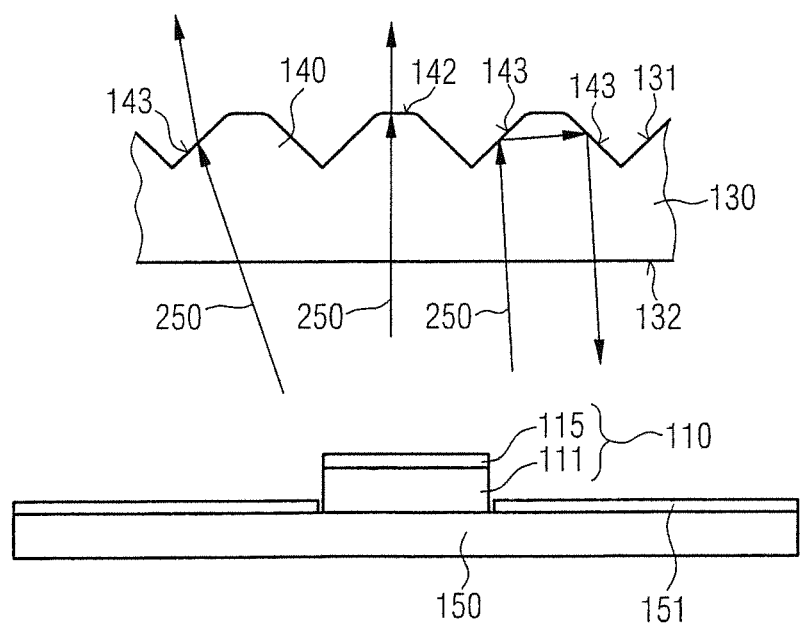
FIG. 11 shows components of the lighting device with an additional representation of radiation paths.

For further illustration of the functioning of the lighting device 100, in FIG. 11 components of the lighting device 100 are shown, including selected radiation paths of a light radiation 250 coupled into the optical element 130. In the radiation path represented on the left in FIG. 11, the angle of incidence of the radiation 250 impinging on the side face 143 of a truncated pyramid 140 from the inside is less than the limiting angle of total reflection. The truncated pyramid 140 acts as a lens by which the outwardly transmitted radiation 250 is refracted away from the axis of incidence. This is accompanied by a bundling of the light.

In the middle radiation path from FIG. 11, transmission of the light radiation 250 takes place through the planar or rounded top area 142 of a truncated pyramid 140. This takes place without or essentially without changing direction.

In the radiation path represented on the right in FIG. 11, the angle of incidence of the radiation 250 impinging on the side face 143 of a truncated pyramid 140 from the inside is greater than the limiting angle of total reflection. As a result, the radiation 250 is totally reflected both at this side face 143 and at an opposite side face 143 of the truncated pyramid 140 and, as a result, is scattered or reflected back in the direction of the carrier 150 with the semiconductor light sources 110, 121.

The optical element 130 with the truncated pyramids 140 consequently not only offers the possibility of emitting the light radiations emitted by the semiconductor light sources 110, 121 with a prescribed radiation characteristic into the desired target area 200. The optical element 130 may also serve in addition as a reflector for return reflection of part of the radiation coupled into the optical element 130. The component of the radiation reflected back can be reflected at the reflective layer 151 of the carrier 150 and at the semiconductor light sources 110, 121, and thereby diffusely scattered, and in this way radiated once again in the direction of the optical element 130 in a mixed form. This leads to a further mixing of the light and, therefore, promotes the homogeneous light radiation of the lighting device 100.

On account of the mixing of the light, the influence of, for example, asymmetries in the arrangement of the semiconductor light sources 110, 121 or asymmetries in the light radiation of the individual semiconductor light sources 110, 121, which may, for example, be a consequence of the chip contacts 112 arranged in the region of the corners (cf. FIGS. 6 and 7), can be suppressed. Also, as already mentioned above, an occurrence of color shadows in the far field of the lighting device 100 as an effect arising as a result of small distances between the semiconductor light sources 110, 121 can be prevented.

Figure 12:
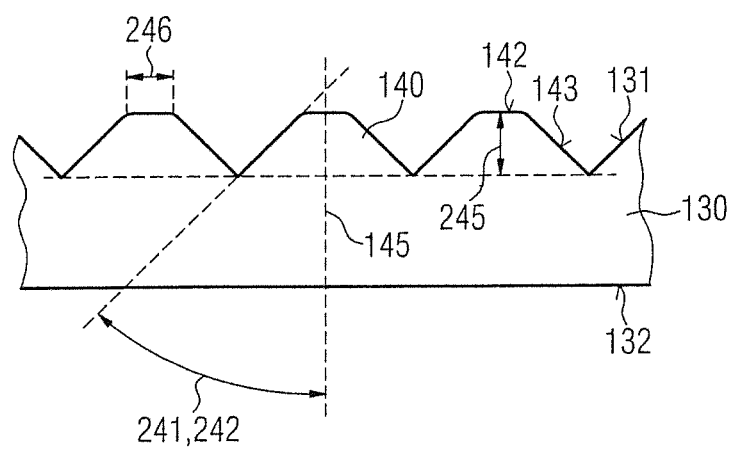
FIG. 12 shows a further sectional representation of the optical element, dimensions of the truncated pyramids and a pyramid angle being additionally indicated.

For efficient functioning, the micro-optical unit 130 may be configured with the following parameters and the parameters additionally indicated in FIG. 12 of a structure size and form. This relative structure geometry, adapted to the size of the semiconductor chips 111, 112, was determined on the basis of an optical simulation.

The semiconductor light sources or their semiconductor chips 111, 121 may have a width B of 0.5 mm to 2 mm, for example, 0.75 mm or 1 mm. A height H of the truncated pyramids 140, which is identified in FIG. 12 by the reference numeral 245, may be: $0.15*B \leq H \leq 0.25*B$.

A height H of $0.2*B$ may be of advantage.

A front-side width D of the truncated pyramids 140 or of their top area 142, which is identified in FIG. 12 by the reference numeral 246, may be as follows: $D=0.13*B$ Also indicated furthermore in FIG. 12 are the pyramid angles 241 and 242 represented in FIG. 10, which each relate to a side face 143 and the connecting line 145 perpendicular to the base area 141 and the top area 142.

One of the pyramid angles 241, 242, referred to hereinafter as wx, which is linked with the horizontal image angle FOVx (reference numeral 201 in FIG. 2), may lie in the following range: $0.83*FOVx \leq wx \leq 0.93*FOVx$.

An angle wx of $0.88*FOVx$ may be of advantage.

The other of the two pyramid angles 241, 242, referred to hereinafter as wy, which is linked with the vertical image angle FOVy (reference numeral 202 in FIG. 2), may lie in the following range: $0.73*FOVy \leq wy \leq 0.83*FOVy$.

An angle wy of $0.78*FOVy$ may be of advantage.

The twists or rounded transitions between the side faces 143 and the top area 142 and also between the side faces 143 themselves may have a radius of 50 μm.

There follows a description of further possible configurations that come into consideration for the lighting device 100 and the component parts thereof. Features and aspects that coincide and components that are the same or have the same effect are not described in detail again below. For details of these, reference is instead made to the previous description. Furthermore, aspects and detail that are mentioned with respect to one configuration may also be applied with respect to another configuration and features of two or more configurations may be combined with one another.

Figure 13:
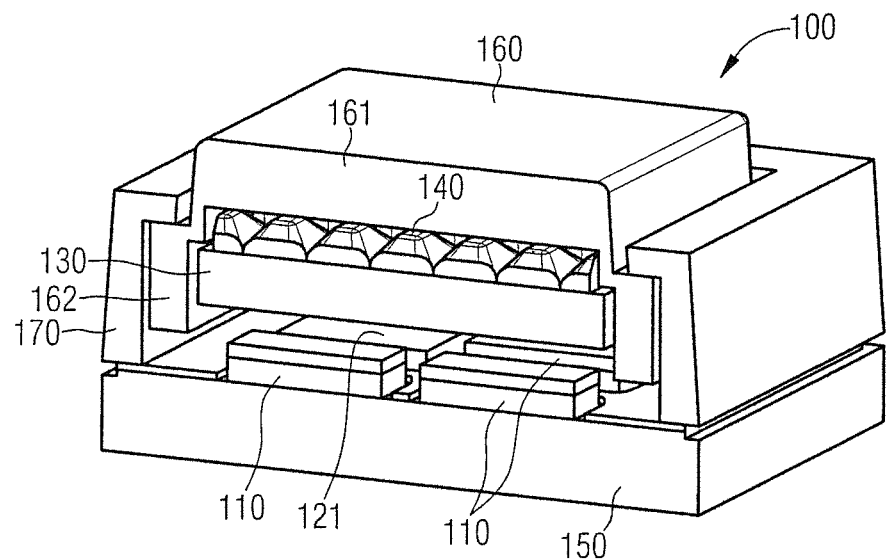
FIG. 13 shows a perspective sectional representation of a further configuration of the lighting device, a structure area of the optical element being essentially of the same size as a light source area comprising four semiconductor light sources.
Figure 14:
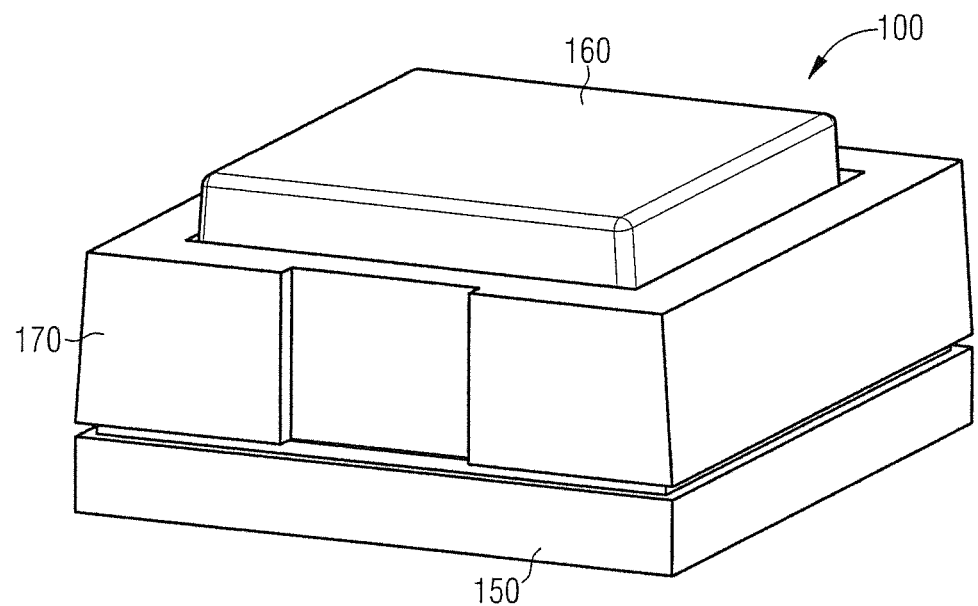
FIGS. 14 and 15 show a perspective representation and an exploded representation of the lighting device from FIG. 13.
Figure 15:
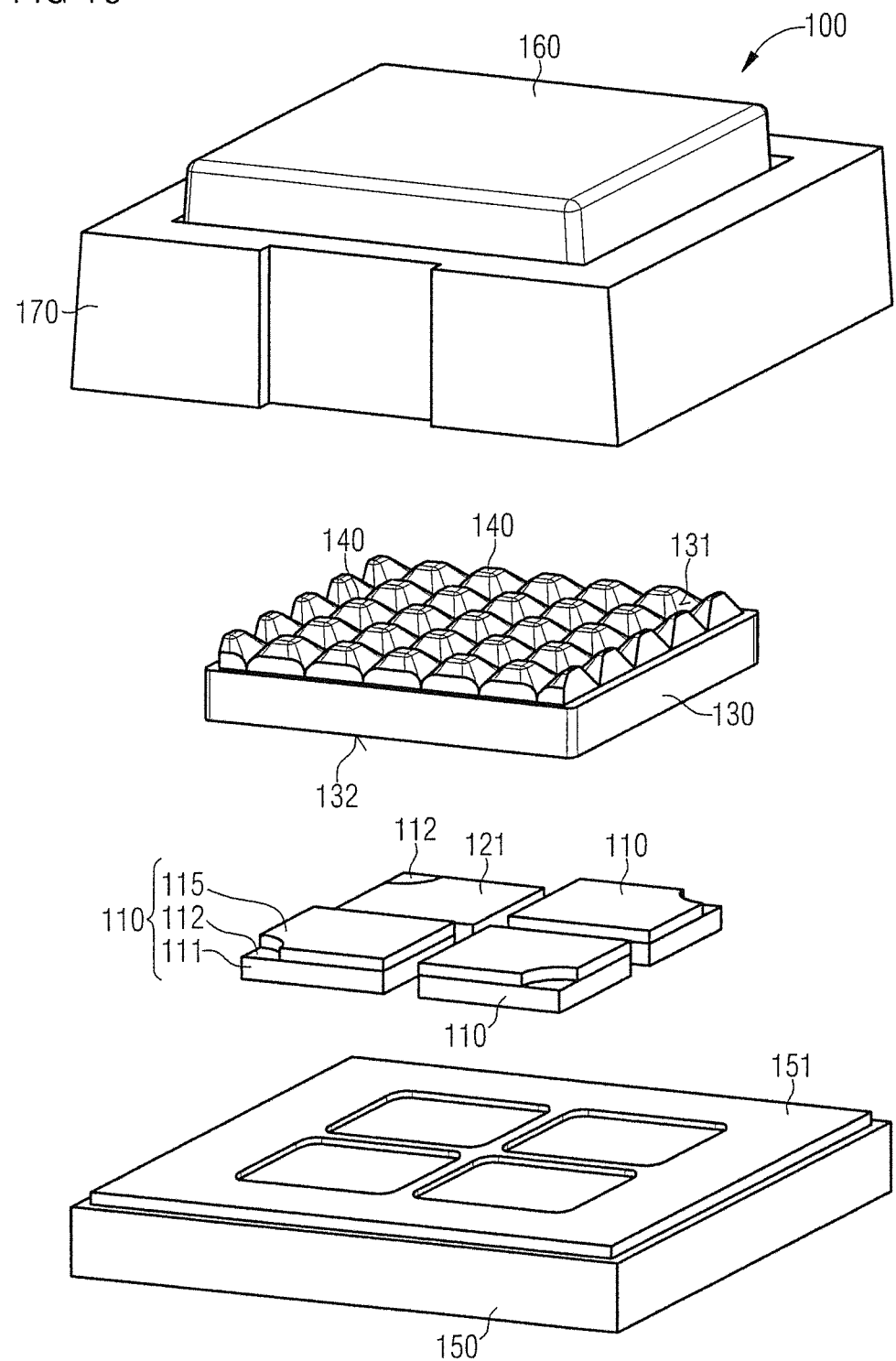

FIG. 13 shows a further possible configuration of the lighting device 100 in a perspective sectional representation. In FIGS. 14 and 15, the lighting device 100 is additionally shown in a further perspective representation and in an exploded representation. The lighting device 100 comprises once again the component parts explained above, i.e., the semiconductor light sources 110, 121, the carrier 150 with the reflective layer 151 with clearances for the semiconductor light sources 110, 121, the optical element 130 with the structure constituted of truncated pyramids 140 on the side 131 facing away from the semiconductor light sources 110, 121, the radiation-transmissive cover 160, covering the optical element 130, and the holder 170, arranged on the carrier 150.

As shown in FIGS. 13 and 15, the lighting device 100 may be realized with four semiconductor light sources 110, 121 arranged on the carrier 150 in a rectangular symmetry and at a small distance from one another. In this configuration, the light sources comprise three white semiconductor light sources 110, each with a radiation-emitting semiconductor chip 111 and a conversion element 115 arranged on it, and also the semiconductor chip 121 configured to generate an infrared light radiation. Also indicated in FIG. 15 is the structural form explained above of the semiconductor chips 110, 121 with a front-side contact 112 and a back-side contact (not represented). Like the carrier 150, the reflective layer 151 has a rectangular or square contour.

Figure 16:
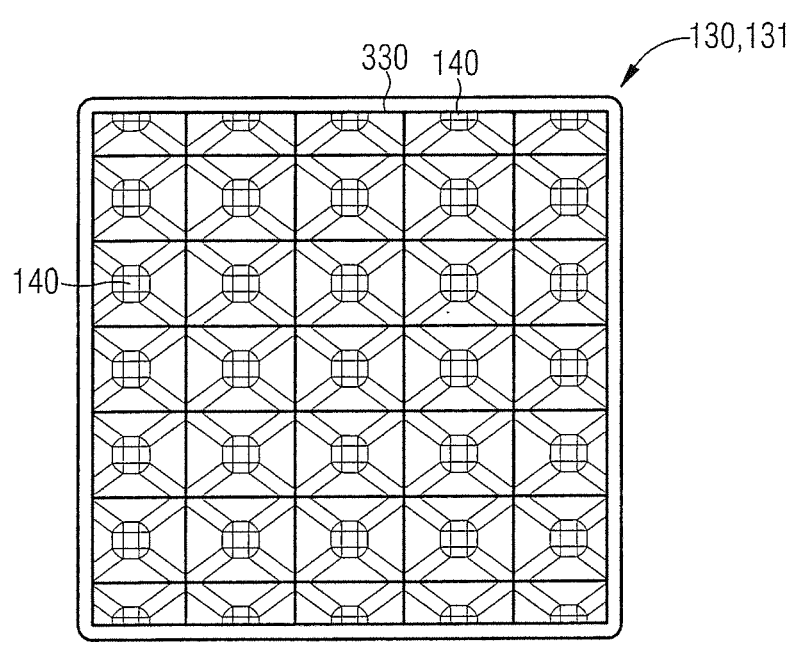
FIG. 16 shows a representation of a plan view of the optical element of the lighting device from FIG. 13.

The optical element 130 in which the side 132 facing the semiconductor light sources 110, 121 is configured as planar and the opposite side 131 comprises the structure constituted of truncated pyramids 140, has, as shown in FIGS. 13 and 15, a rectangular, for example, square contour (cf. also FIG. 16). In the assembled state of the lighting device 100, the planar side 132 of the optical element 130 is kept at a distance from the semiconductor light sources 110, 121 so that there is an air gap.

It is also clear from FIGS. 13 to 15 that the cover 160 and the holder 170 comprise a configuration with rectangular contours and geometries that is specifically designed for the rectangular optical element 130. The cover 160 comprises a plate-shaped rectangular or square portion 161, opposite which there is at a distance in the assembled state of the lighting device 100 the side 131 of the optical element 130 configured in a structured manner. The cover 160 also comprises extending from the portion 161 a collar-shaped portion 162 having in cross section a stepped form and by which the optical element 130 is enclosed in a frame-like manner. The holder 170, arranged on the carrier 150 or on the reflective layer 151 of the carrier 150, has a form that encloses the cover 160, or the portion 162 thereof, in a frame-like manner, with a sub-portion protruding inwardly on the front side. The cover 160 and micro-optical unit 130, and also the holder 170 and the cover 160, may connect to one another by way of a connecting means not represented such as, for example, an adhesive. This applies in a corresponding way to the holder 170 and the carrier 150.

FIG. 16 shows a representation of a plan view of the structured side 131 of the rectangular optical element 130. It is clear from this representation that the structure constituted of truncated pyramids 140 is located in a rectangular or square structure area 330 of the optical element 130. The structure area 330 has a contour corresponding to the contour of the optical element 130 and is somewhat smaller compared to the contour of the optical element 130. As a result, the side 131 of the optical element 130 comprises a planar area running rectangularly around the structure area 330. The planar area may be used, together with the lateral periphery of the optical element 130, to secure the optical element 130 on the cover 160. As indicated in FIG. 13, the stepped form of the portion 162 of the cover 160 is configured as adapted to this form of the optical element 130.

In the lighting device 100 shown in FIGS. 13 to 15, the structure area 330 of the optical element 130 is of essentially the same size in terms of the lateral dimensions as a hypothetical rectangular or square light source area 310 comprising the semiconductor light sources 110, 121. To explain this situation, two further representations of plan views of the optical element 130, including the four semiconductor light sources 110, 121, are shown in FIG. 17. For reasons of overall clarity, the truncated pyramids 140 have been omitted. In the upper representation of FIG. 17, the structure area 330 of the optical element 130 is highlighted by hatching. On the other hand, the hypothetical light source area 310 is highlighted by hatching in the lower representation of FIG. 17. The light source area 310, which when seen in plan view is completely covered by the structure area 330 and arranged in which are the semiconductor light sources 110, 121 positioned in a rectangular symmetry in relation to one another, is defined by the contours of the semiconductor light sources 110, 121.

It is clear from FIG. 17 that the structure area 330 of the rectangular optical element 130 is only insignificantly larger than the light source area 310. Such a configuration is possible on account of the mixing functionality of the optical element 130. As described above, a partial return reflection of radiation can be brought about by the structure constituted of truncated pyramids 140. This component of the radiation can be reflected at the reflective layer 151 of the carrier 150 and at the semiconductor light sources 110, 121, and diffusely scattered and, as a consequence, radiated once again in the direction of the optical element 130 in a mixed form. In this way, the law of conservation of etendue applicable to optical systems can be transgressed, and the optical element 130 or the optically effective structure area 330 of the optical element 130 may be configured as of the same size or essentially of the same size as the light source area 310 comprising the semiconductor light sources 110, 121.

In the lighting device 100 shown in FIGS. 13 to 15, this situation is used to form the optical element 130 and further component parts such as the carrier 150, the cover 160 and the holder 170 with small lateral dimensions. Therefore, the lighting device 100 comprises a compact and space-saving structure. This promotes the use described above of the lighting device 100 in the mobile device 190.

It is also clear from FIG. 17 that the structure area 330 and the light source area 310, both of which may have a square contour as represented in FIG. 17 are arranged symmetrically in relation to one another. In this configuration, the structure area 330 may protrude laterally beyond the light source area 310 on all four sides of the light source area 310.

Also indicated in FIG. 17 are widths 315, 316, 335, 336 of the light source area 310 and the structure area 330 that relate to the horizontal extent and vertical extent of the regions 310, 330 in the plane of the drawing of FIG. 17. For a structural design of the lighting device 100 that is as compact as possible, the optical element 130 may be configured and the semiconductor light sources 110, 121 may be arranged such that the width 335 of the structure area 330 is at most 20% greater than the width 315 of the light source area 310. In a corresponding way, the width 336 of the structure area 330 may be at most 20% greater than the width 316 of the light source area 310. In the square configuration indicated in FIG. 17, the widths 315, 316 and the widths 335, 336 are each of the same size.

Figure 18:
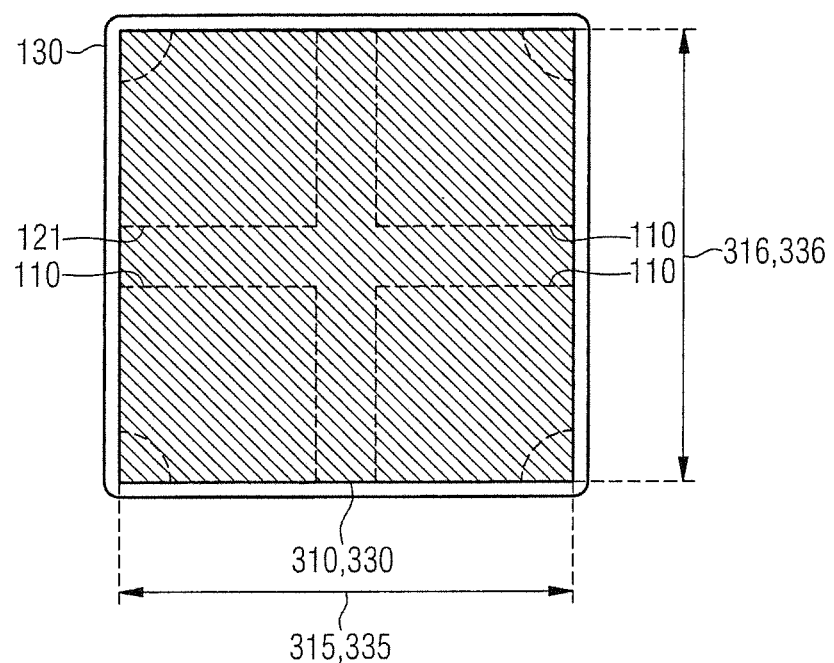
FIG. 18 shows a further representation of a plan view of the optical element and of the semiconductor light sources, a configuration in which the structure area and the light source area are of the same size being shown.

FIG. 18 shows on the basis of a representation of a plan view of the optical element 130 of the semiconductor light sources 110, 121 a further possible configuration that may come into consideration for the lighting device 100 of FIGS. 13 to 15. In this configuration, the structure area 330 and the hypothetical light source area 310 and, consequently, the widths 315, 316, 335, 336, are of the same size. The structure area 330 is located congruently over the light source area 310.

The lighting device 100 of FIGS. 13 to 15 with the rectangular or square optical element 130 may, in a way corresponding to the lighting device 100 explained above with the circular optical element 130, be realized only with three white semiconductor light sources 110. Also, in such a configuration, the structure area 330 of the optical element 130 may be of the same size or essentially the same size as the hypothetical light source area 310 comprising the semiconductor light sources 110.

To illustrate such a configuration, FIG. 19 shows representations of plan views comparable to FIG. 17 of the optical element 130, including the semiconductor light sources 110. In the lower representation of FIG. 17, the hypothetical light source area 310 is highlighted by hatching. The light source area 310 has once again a rectangular or square form. In this configuration, the form of the light source area 310 is defined by the contours of the three semiconductor light sources 110 positioned in a rectangular symmetry in relation to one another. As in the configuration explained on the basis of FIG. 17, the structure area 330 is insignificantly larger than the light source area 310 and protrudes beyond the light source area 310 on all four sides of the light source area 310. For a structural design of the lighting device 100 that is as compact as possible, the widths 335, 336 of the structure area 330 may be at most 20% greater than the widths 315, 316 of the light source area 310. A configuration in which the structure area 330 and the hypothetical light source area 310 are of the same size (not represented) is also possible.

Like the rectangular optical element 130 explained above, the circular optical element 130 shown in FIG. 8 comprises a structure area on the side 131 and a planar area running around the structure area. In a way corresponding to the circular contour of the optical element 130, the planar area has the form of a circle or the form of a circular ring. Also in this configuration, the stepped form of the portion 162 of the associated cover 160 is configured as adapted thereto as shown in FIG. 4.

The structures explained on the basis of the figures represent examples that are preferred or given by way of example. Apart from the examples described and depicted, further examples, which may comprise further modifications and/or combinations of features, are possible.

It is, for example, possible to use other materials instead of the materials specified above. Furthermore, other dimensions and situations may be provided instead of the dimensions and geometrical situations specified above for components of the lighting device, for example, for the truncated pyramids.

In this connection, it is also possible to realize components of the lighting device, for example, the carrier, the optical element, the cover and the like, with other outer contours.

Instead of the configurations shown in the figures with three white semiconductor light sources, configurations with other numbers of white semiconductor light sources may come into consideration. These include lighting devices with only two or more than three semiconductor light sources configured to generate white light radiations with different white tones.

In the configurations shown in FIGS. 4, 5 and 13, the holder holds the cover, which for its part holds the optical element. As a departure, configurations in which both a cover and an optical element are secured on a holder arranged on a carrier and, as a result, are held by it, are possible.

A further possible modification is a lighting device without a cover. The lighting device may thus comprise a holder arranged on the carrier only to hold the optical element.

If it is technically possible in terms of the process, semiconductor light sources or semiconductor chips may be arranged directly adjacent to one another on a carrier.

Instead of semiconductor chips with a front-side contact and a back-side contact, other structural forms of semiconductor chips may be used. These include semiconductor chips with only front-side contacts or, as already indicated above, semiconductor chips with only back-side contacts. A carrier that is used may comprise mating contacts adapted thereto.

With respect to a configuration in which an optical element or its structure area is of the same size or essentially the same size as a light source area that encloses the semiconductor light sources and is defined by the contours of the semiconductor light sources, possible modifications are that the structure area and/or the light source area have a rectangular form other than a square. With respect to the hypothetical light source area, such a distinctive form may be caused by the number and/or arrangement of the semiconductor light sources. In this connection, configurations in which the structure area does not protrude laterally beyond the light source area on all four sides of the light source area but on a smaller number of sides, for example, on only two opposite sides of the light source area, may be realized.

Although my devices have been more specifically illustrated and described in detail by preferred examples, this disclosure is not restricted by the examples, and other variations may be derived from them by those skilled in the art without departing from the scope of protection of the appended claims.

This application claims priority of DE 10 2016 101 614.4, the subject matter of which is incorporated herein by reference.

The invention claimed is:

1. A lighting device comprising:
   a plurality of semiconductor light sources, the semiconductor light sources being configured to generate different light radiations; and
   an optical element arranged downstream of the semiconductor light sources, the optical element comprising on a side facing away from the semiconductor light sources a structure constituted of truncated pyramids, wherein transitions between side faces of the truncated pyramids and transitions between side faces and a top area of the truncated pyramids are rounded.

2. The lighting device according to claim 1, wherein the plurality of semiconductor light sources are individually activatable.

3. The lighting device according to claim 1, wherein the truncated pyramids comprise four side faces and are arranged in a rectangular grid.

4. The lighting device according to claim 1, wherein the plurality of semiconductor light sources are arranged in a rectangular symmetry.

5. The lighting device according to claim 1, wherein a distance between adjacent semiconductor light sources is at most 0.1 mm.

6. The lighting device according to claim 1, wherein the lighting device is a flashlight.

7. The lighting device according to claim 1, wherein at least some of the plurality of semiconductor light sources are configured to generate white light radiations with different white tones.

8. The lighting device according to claim 1, wherein at least some of the plurality of semiconductor light sources comprise a radiation-emitting semiconductor chip and a conversion element for radiation conversion arranged on the semiconductor chip.

9. The lighting device according to claim 1, wherein one of the plurality of semiconductor light sources is configured to generate an infrared light radiation.

10. The lighting device according to claim 1, further comprising a carrier on which the semiconductor light sources are arranged.

11. The lighting device according to claim 10, wherein the carrier comprises a reflective layer laterally of the semiconductor light sources.

12. The lighting device according to claim 1, further comprising at least one of:
a cover with which the side of the optical element facing away from the semiconductor light sources is covered; or
a holding device that holds the optical element and/or the cover.

13. The lighting device according to claim 1, configured to illuminate a rectangular target area at a first image angle FOVx and at a second image angle FOVy.

14. The lighting device according to claim 13, wherein the truncated pyramids are right truncated pyramids comprising four trapezoidal side faces, a rectangular top area and a rectangular base area,
the truncated pyramids comprise a first and a second pyramid angle wx, wy that relate to an inclination of the side faces with respect to a connecting line of centroids of the base area and the top area,
two opposite side faces comprise the first pyramid angle wx and two further opposite side faces comprise the second pyramid angle wy,
the first pyramid angle wx are linked with the first image angle FOVx and the second pyramid angle wy are linked with the second image angle FOVy as follows:

$0.83*FOVx \leq wx \leq 0.93*FOVx$; and $0.73*FOVy \leq wy \leq 0.83*FOVy$.

15. The lighting device according to claim 1, wherein the truncated pyramids are right truncated pyramids comprising four trapezoidal side faces, a rectangular top area and a rectangular base area, the semiconductor light sources comprise a width B in a range from 0.5 mm to 2 mm,
a front-side width D of the truncated pyramids are linked with the width B of the semiconductor light sources according to $D=0.13*B$, and a height H of the truncated pyramids are linked with the width B of the semiconductor light sources as follows:

$0.15*B \leq H \leq 0.25*B$.

16. The lighting device according to claim 1, wherein the structure constituted of truncated pyramids is arranged in a rectangular structure area of the optical element,
a rectangular light source area in which the semiconductor light sources are arranged and the contour of which is defined by the contours of the semiconductor light sources, is covered by the structure area,
and the structure area and the light source area are of the same size or essentially the same size.

17. The lighting device according to claim 1, wherein the optical element being radiation-transmissive, and
the truncated pyramids being configured in the form of elevations.

18. A mobile device, comprising a lighting device according to claim 1.

19. A lighting device comprising:
a plurality of semiconductor light sources, the semiconductor light sources being configured to generate different light radiations; and
an optical element arranged downstream of the semiconductor light sources, the optical element comprising on a side facing away from the semiconductor light sources a structure constituted of truncated pyramids,
wherein the lighting device is configured to illuminate a rectangular target area at a first image angle FOVx and at a second image angle FOVy,
the truncated pyramids are right truncated pyramids comprising four trapezoidal side faces, a rectangular top area and a rectangular base area,
the truncated pyramids comprise a first and a second pyramid angle wx, wy that relate to an inclination of the side faces with respect to a connecting line of centroids of the base area and the top area,
two opposite side faces comprise the first pyramid angle wx and two further opposite side faces comprise the second pyramid angle wy,
the first pyramid angle wx is linked with the first image angle FOVx and the second pyramid angle wy is linked with the second image angle FOVy as follows:

$0.83*FOVx \leq wx \leq 0.93*FOVx$; and $0.73*FOVy \leq wy \leq 0.83*FOVy$.

20. A lighting device comprising:
a plurality of semiconductor light sources, the semiconductor light sources being configured to generate different light radiations; and
an optical element arranged downstream of the semiconductor light sources, the optical element comprising on a side facing away from the semiconductor light sources a structure constituted of truncated pyramids,
wherein the truncated pyramids are right truncated pyramids comprising four trapezoidal side faces, a rectangular top area and a rectangular base area, the semiconductor light sources comprise a width B in a range from 0.5 mm to 2 mm, a front-side width D of the truncated pyramids is linked with the width B of the semiconductor light sources according to $D=0.13*B$, and a height H of the truncated pyramids is linked with the width B of the semiconductor light sources as follows:

$0.15*B \leq H \leq 0.25*B$.

* * * * *